(12) United States Patent
Ganu et al.

(10) Patent No.: US 10,080,166 B2
(45) Date of Patent: Sep. 18, 2018

(54) SOFTWARE DEFINED WIRELESS DEVICE MANAGEMENT

(71) Applicant: Aruba Networks, Inc., Sunnyvale, CA (US)

(72) Inventors: Sachin Ganu, San Jose, CA (US); Jin Xie, Sunnyvale, CA (US); Partha Narasimhan, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1079 days.

(21) Appl. No.: 14/264,525

(22) Filed: Apr. 29, 2014

(65) Prior Publication Data
US 2015/0312131 A1 Oct. 29, 2015

(51) Int. Cl.
| | |
|---|---|
| H04L 12/26 | (2006.01) |
| H04W 36/08 | (2009.01) |
| H04W 36/00 | (2009.01) |
| H04L 12/24 | (2006.01) |
| H04W 76/10 | (2018.01) |
| H04W 48/14 | (2009.01) |
| H04W 36/24 | (2009.01) |

(52) U.S. Cl.
CPC ..... H04W 36/0083 (2013.01); H04L 41/0866 (2013.01); H04L 43/16 (2013.01); H04W 36/08 (2013.01); H04W 48/14 (2013.01); H04W 76/10 (2018.02); *H04W 36/245* (2013.01)

(58) Field of Classification Search
CPC .... H04L 41/0866; H04L 43/16; H04W 48/14; H04W 76/02; H04W 36/0083; H04W 36/245; H04W 36/32; H04W 36/08
See application file for complete search history.

(56) References Cited

U.S. PATENT DOCUMENTS 6,360,264 B1 * 3/2002 Rom ................. H04W 36/0055
709/227
7,835,742 B2 * 11/2010 Jaakkola ........... H04L 29/12009
370/329

(Continued)

FOREIGN PATENT DOCUMENTS

| CN | 102647771 A | 8/2012 |
|---|---|---|
| EP | 2824870 A1 | 1/2015 |

(Continued)

*Primary Examiner* — Aaron Strange
(74) *Attorney, Agent, or Firm* — Hewlett Packard Enterprise Patent Department

(57) ABSTRACT

The present disclosure discloses a method and network device for software-defined client device management. Specifically, a network device can cause a client device to switch association with a first access point to a second access point. The network device determines whether a number of times the client device has been caused to switch association with an access point exceeds a threshold value for the first period of time. If not, the network device causes the client device to switch to an association with a third access point. Also, the network device determines a configuration indicating when any access point with which a client device is associated may be modified. Based on the configuration, the network device determines whether an association of the client device should not be modified. Also, based on one or more attributes, the network device selectively causes the client device to switch an association.

20 Claims, 6 Drawing Sheets

(56) References Cited

U.S. PATENT DOCUMENTS

| | | | | |
|---|---|---|---|---|
| 8,023,433 B2* | 9/2011 | Andou | ................ | H04L 12/1886 |
| | | | | 370/254 |
| 8,913,589 B2* | 12/2014 | Zhang | ................... | H04L 47/808 |
| | | | | 370/331 |
| 9,560,552 B2* | 1/2017 | Li | ..................... | H04W 36/0055 |
| 2004/0264427 A1* | 12/2004 | Jaakkola | ........... | H04L 29/12009 |
| | | | | 370/338 |
| 2006/0007930 A1* | 1/2006 | Dorenbosch | ........ | H04L 12/1886 |
| | | | | 370/390 |
| 2007/0070935 A1* | 3/2007 | Prakash | ................ | H04L 63/102 |
| | | | | 370/328 |
| 2007/0177510 A1* | 8/2007 | Natarajan | ............ | H04W 36/22 |
| | | | | 370/238 |
| 2008/0009267 A1* | 1/2008 | Ramos Robles | ... | H04L 63/1425 |
| | | | | 455/411 |
| 2011/0261786 A1* | 10/2011 | Bontu | ................... | H04W 48/02 |
| | | | | 370/331 |
| 2012/0173765 A1* | 7/2012 | 't Hooft | ................ | G06F 1/1632 |
| | | | | 710/8 |
| 2012/0224522 A1* | 9/2012 | Kim | ........................ | H04W 4/06 |
| | | | | 370/312 |
| 2012/0314641 A1* | 12/2012 | Kotecha | ................ | H04H 20/42 |
| | | | | 370/312 |
| 2013/0237233 A1* | 9/2013 | Radulescu | ............ | H04W 36/22 |
| | | | | 455/440 |
| 2013/0272285 A1* | 10/2013 | Goldsmith | ............ | H04W 24/02 |
| | | | | 370/338 |
| 2014/0066074 A1* | 3/2014 | Folke | .................... | H04W 36/08 |
| | | | | 455/437 |

FOREIGN PATENT DOCUMENTS

| | | | |
|---|---|---|---|
| EP | | 2844025 A1 | 3/2015 |
| WO | WO-2013/159648 A1 | | 10/2013 |

\* cited by examiner

SOFTWARE DEFINED WIRELESS DEVICE MANAGEMENT

FIELD

The present disclosure relates to network management in a wireless local area network (WLAN). In particular, the present disclosure relates to a mechanism for software-defined wireless device management in a WLAN.

BACKGROUND

Wireless digital networks, such as networks operating under the current Electrical and Electronics Engineers (IEEE) 802.11 standards, are spreading in their popularity and availability. Conventionally, in a wireless local area network (WLAN), a network device is capable of finding the best radio of all access points (APs) in the WLAN for each client to connect with. Specifically, the network device can identify one or more clients with incompatible behaviors, and match the one or more clients to another radio of the same or different access point in the WLAN that the clients are compatible with. Thus, the conventional network device can homogenize client behaviors without requiring any client-side installation of software applications.

Nevertheless, the approach described above has certain limitations. For example, there are a number of behaviors that the network device expects from the client devices. The client devices may not perform the expected behavior due to various reasons, e.g., lack of interoperability, power save mode configuration, device-specific configurations, etc. Therefore, a more flexible approach is needed for matching client devices to the best radios of the APs in the WLAN.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
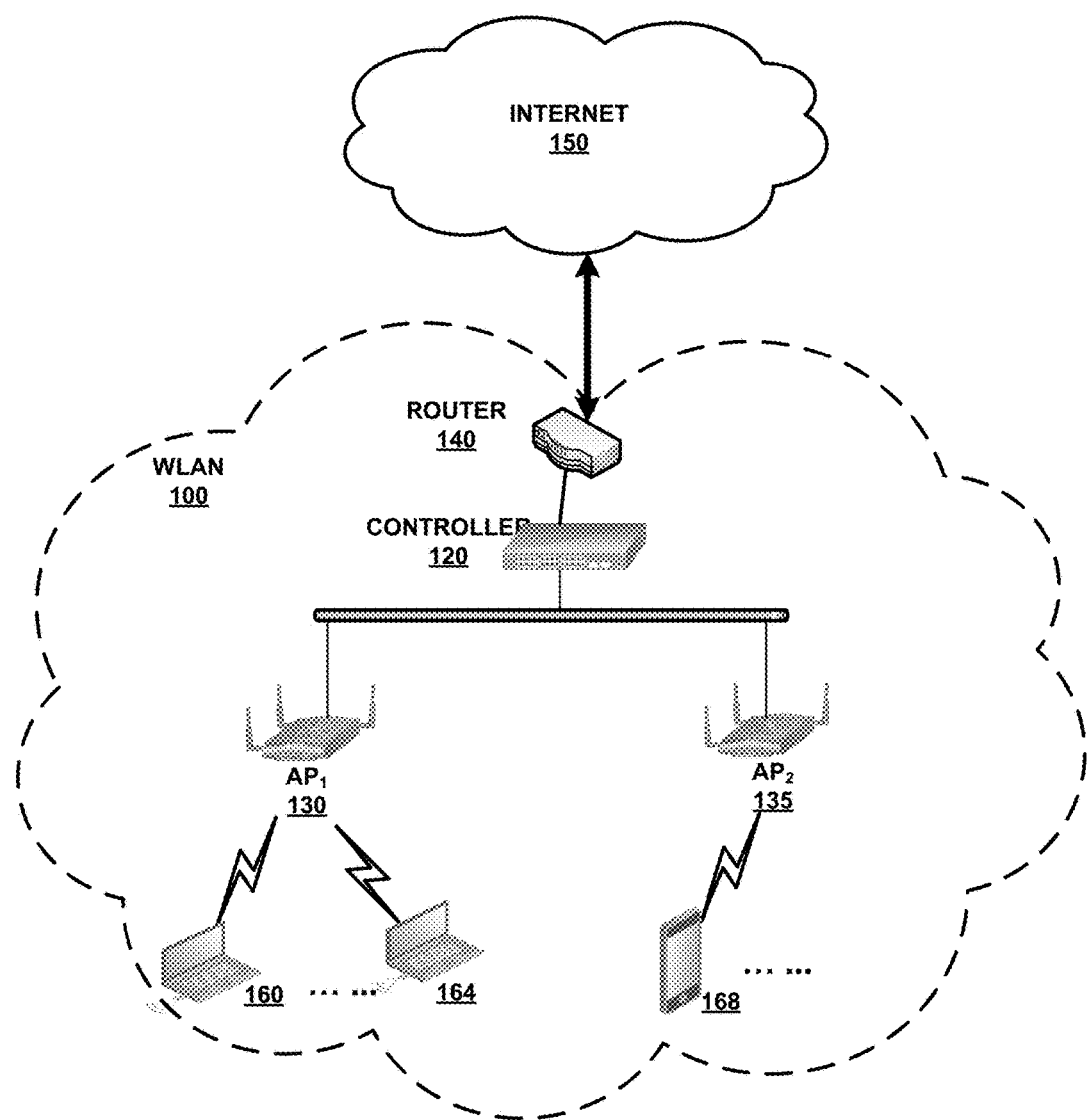
FIG. 1 shows exemplary computing environment according to embodiments of the present disclosure.

In the following description, several specific details are presented to provide a thorough understanding. While the context of the disclosure is directed to software-defined wireless device management in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to network management in a wireless local area network (WLAN). In particular, the present disclosure relates to a mechanism for software-defined wireless device management in a WLAN.

According to embodiments of the present disclosure, the system can accept any set of arbitrary rules or triggers from an application programmable interface (API). The API can be used by any external entities to specify, e.g., for a particular client device or a particular set of client devices meeting certain criteria, what actions are to be taken. The system can then perform the specified actions for the particular client device (or set of client devices), and further utilize a lower level mechanism to move the client devices based on the actions taken.

With the solution provided herein, a disclosed network device causes a client device to switch association with a first access point to an association with a second access point during a first period of time. The disclosed network device determines a number of times the client device has been caused to switch association with an access point during the first period of time, Moreover, the disclose network device also determines whether the number exceeds a threshold value for the first period of time. If the disclosed network device at least determines that the number does not exceed the threshold value, the disclosed network device causes the client device to switch the association with the second access point to an association with the third access point.

Moreover, according to some embodiments, the disclosed network device determines for a first client device of a plurality of client devices a corresponding first configuration which indicates when any access point with which the client device is associated may be modified. Based on the first configuration, the disclosed network device determines that an association of the first client device with a first access point should not be modified. Further, the disclosed network device determines for a second client device of the plurality of client devices a corresponding second configuration which indicates when any access point with which the second client device is associated may be modified. Note that, the second configuration is different than the first configuration. Based on the second configuration, the disclosed network device determines that an association of the second client device with the first access point should be modified to an association with a second access point.

In addition, the disclosed network device determines one or more attributes corresponding to a client device associated with a first access point. Based on the one or more attributes, the disclosed network device determines that the association of the client device with the first access point should be switched to an association with a second access point. Based on the one or more attributes, the disclosed network device selects a mechanism, of a plurality of mechanisms, for causing the client device to switch an association with the first access point to an association with the second access point. Also, the disclosed network device uses the selected mechanism to cause the client device to switch from the association with the first access point to the association with the second access point.

Computing Environment

FIG. 1 shows exemplary computing environment according to embodiments of the present disclosure. Specifically, FIG. 1 includes a controller 120 and a plurality of access points, e.g., $AP_1$ 130 and $AP_2$ 135, in a wireless local area network (WLAN) 100. WLAN 100 may be also connected to Internet 150 or another external network via a router 140. Moreover, controller 120 is communicatively coupled with one or more access points (APs), such as $AP_1$ 130 and $AP_2$ 135, to provide wireless network services by transmitting network packets.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with $AP_1$ 130, and client devices, such as client device 168, are associated with $AP_2$ 135. Note that, client devices may be connected to the access points via wired or wireless connections.

During operations, a wireless station, such as client device 160, client device 164, or client device 168, is associated with a particular radio of a respective access point, e.g., access point $AP_1$ 130, access point $AP_2$ 135, etc. Different access points may have different capabilities. For example, $AP_1$ 130 may support IEEE 802.11ac standards, whereas $AP_2$ 135 may support IEEE 802.11n standards. Likewise, different client devices may have different capabilities as well. For example, client device 160 may be compatible with IEEE 802.11n standard, whereas client device 168 may be compatible with both IEEE 802.11ac and IEEE 802.11n standards.

Controller 120 may determine that a particular access point (e.g., $AP_1$ 130) best matches a particular client device (e.g., client device 168) based on the information about the access points and the client devices known to controller 120. Such determination by controller 120 can be communicated to access points, including $AP_1$ 130 and $AP_2$ 135, in WLAN 100. Thereafter, an access point (e.g., $AP_2$ 135) may de-authenticate a client device (e.g., client device 168), such that the client device (e.g., client device 168) can establish an association with another access point (e.g., $AP_1$ 130) that are more compatible with the client device's capabilities and thus are likely to provide better service for the client device.

Figure 2:
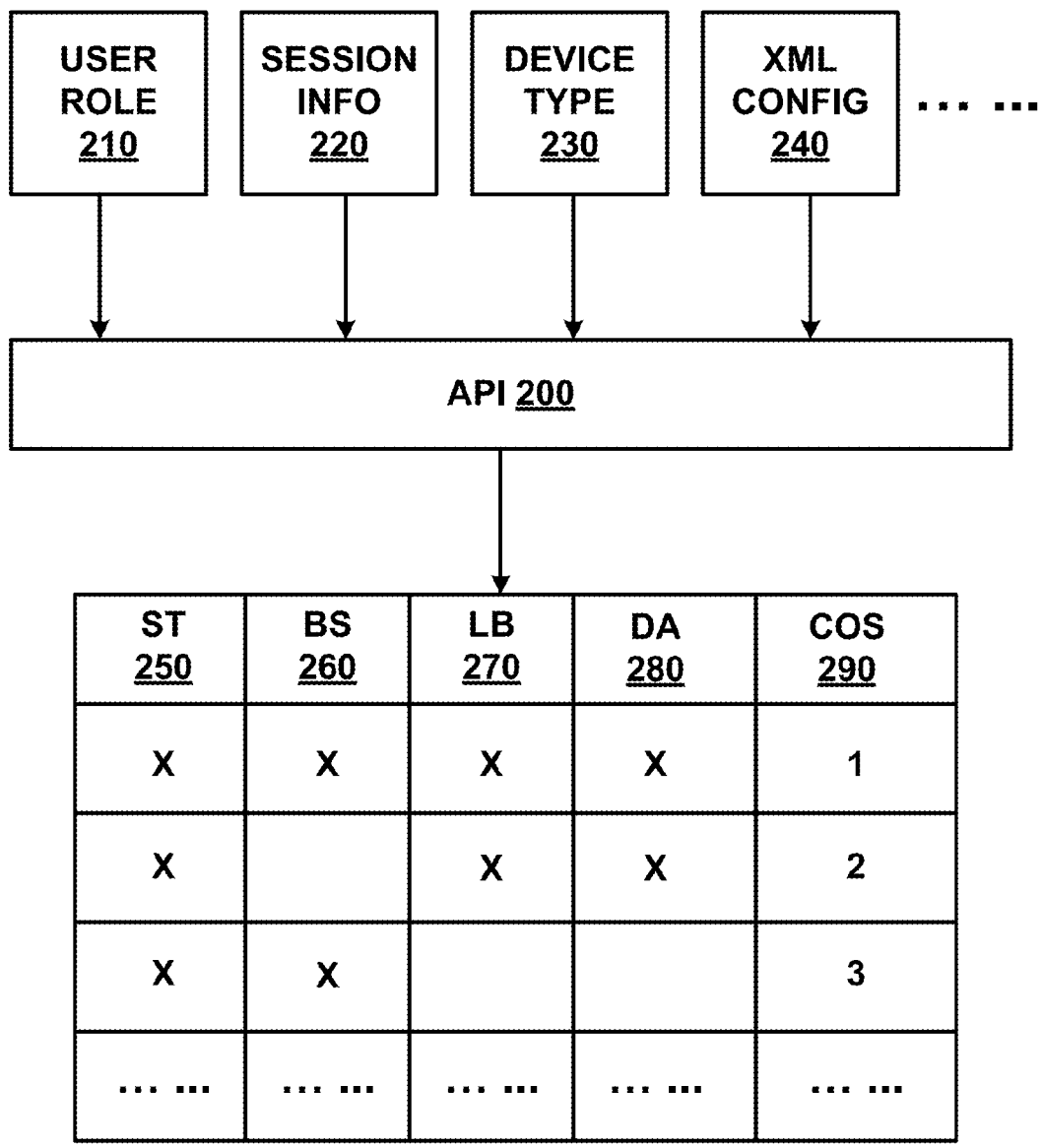
FIG. 2 illustrates exemplary software-defined client management system according to embodiments of the present disclosure.

FIG. 2 illustrates an application programmable interface (API) that is provided by controller and/or APs in a WLAN and that can be used by an external entity. The external entities may be any type of hardware device and/or software application capable of communicating through a software-defined application interface. FIG. 2 includes API 200, and one or more external triggers, such as user role 210, session information 220, device type 230, XML configuration 240, etc. In addition, FIG. 2 also includes an exemplary rule engine for mapping a plurality of configurable parameters to a class of service category for a client device and/or a set of client devices.

API 200 can determine a proper class of service for a particular client device (or subset of client devices) based on the triggers received from the external entity and the rules specified in the rule engine.

The rule engine can be configured either by a network administrator or by dynamic machine learning technologies. For example, a software application may dynamically learn that a particular network application executing on a client device is encountering problems. The software application may determine to lower the class of service for the client device associated with the particular network application. Therefore, the network system may perform or refrain from performing certain actions based on the dynamic adjustment of the rules in the rule engine.

Triggers

Generally speaking, the triggers that can activate API 200 to perform an action include, but are not limited to, a type of traffic, a user role, an operating system, session information, a device type, a manufacturer of device, a Network Interface Card (NIC) of a device, an application type, etc. Such triggers exposed to an external entity allows an external entity to a WLAN to use a combination of triggering parameters to control the network system in its decision regarding whether and how to move a particular client device (or a particular set of client devices) from one radio of one access point to another radio of a different access point in the WLAN that better matches the client device's capabilities. The rule engine can be executed on a network controller, a private cloud, etc.

A. User Role

API 200 may specify user role 210 as a trigger for the network device to perform a particular action. For example, a CTO of a company may be designated a special user role (e.g., VIP). The network system can be configured to provide a different class of service for the client devices that are authenticated by users belonging to the special user role. The different class of service may include, e.g., ensuring that the corresponding client devices are always matched to the best radio among all APs in the WLAN, and/or ensuring that the corresponding client devices are not de-authenticated to be moved to associate with another AP very often, ensuring a minimum quality of service for the corresponding client devices, etc.

In the following example, all sessions associated with a user whose user role is admin are configured to be provided with platinum level class of service.

--- user-role admin
   access-list session allow-all
   cm-cos platinum

---

B. Session Information

Session information 220 may specify what type of traffic is being transmitted on a particular client device or a particular set of client devices. For example, if the system determines that a client device is currently making a voice call, the system may perform various courses of actions based on the determination that the voice call is active. For example, the system may be configured to avoid de-authenticate client devices when a voice call is active. As another example, the system may determine to move a client to a different radio and/or access point upon detecting poor voice call quality.

As another example, the system may move another client device that is currently associated with a particular AP to a different AP, such that an incoming client device that will be associated with the particular AP and that is on an active voice call can establish an associated with the particular AP with good voice call quality. In particular, the network system may detect that a particular client device is roaming from a first AP to a second AP. A number of client devices (e.g., 10 devices) are currently associated with the second AP, which does not have any extra capacity for accommodating an incoming client device on an active voice call. Furthermore, the network system can detect that the client devices that are currently associated with the second AP are running applications (e.g., Internet browsers) that use Hypertext Transfer Protocol (HTTP) for data transmissions. Thus, the network system can proactively move a subset of client devices that are currently associated with the second AP but in an idle state to a different AP prior to the particular client device sends an association request to the second AP, such that the second AP has the capacity to allow the particular client device on an active voice call to associate with itself.

In some embodiments, when a client device is executing a unified communication (UC) application for a video/audio call, a user can configure the session information trigger based on a known port number and/or Media Access Control (MAC) identifier. When it is known a priori that the UC application has low tolerance for the network packet loss, the network administrator can configure the set of client devices running such client-side application to be associated with a class of service that provides high level of client matching priorities.

In the following example, if a particular traffic session associated with a particular type of application, e.g., Lync® application, becomes active on a client device, the client device will be provided with platinum level class of service until the session expires.

```
ip access-list session lync-acl
    any any svc-sips permit queue high cm-cos platinum
    any any any permit
```

C. Device Type

Known device type, as well as device behaviors or operating systems, can also be specified as triggers to the API. For example, the system can detect whether a particular client device is an Apple® device installed with iOS® operating system by fingerprinting a client device at a most detailed level. The system can then specify an external trigger based on such device behaviors and/or operating systems. For example, the system may determine not to move a client device to another AP in the WLAN if the client device uses an iOS operating system. As another example, the system may limit the number of moves for a particular client device installed with a particular operating system.

D. XML Configuration

In addition, the system may allow the external entity to use an XML configuration to specify a trigger for the system to perform an action. The XML configuration can be configured by a user dynamically without requiring any code change in the system's existing logic used for moving client devices.

In some embodiments, many client devices may subscribe to the same multicast stream. Such client devices may be associated with different APs in the WLAN. Note that, it is generally undesirable for multiple client devices subscribing to one multicast stream to be connected to different APs. This is because the network system would need to transmit multiple copies of the multicast packet, each to a different AP. On the other hand, if all client devices subscribing to the same multicast stream are connected to the same AP, then the network system only need to transmit one copy of the multicast packet to the AP that the client devices are connected to. This would greatly improve the efficiency of the network system by avoid flooding extra multicast packets in the network system.

Nevertheless, the network system may not be aware that there are multiple client devices subscribing to the same multicast stream that are connected to different APs in the WLAN. An external entity, however, may be aware of the multicast stream subscription information. Thus, the external entity can use the XML configuration file to group the client devices based on their multicast stream subscription. The XML configuration file may trigger the network system to move all client devices subscribing to the same multicast stream to the same radio and/or AP in the WLAN.

In the following example, if a device is known to be incompatible with client matching configurations of the network system, for instance, based on its operating system (OS) and/or Network Interface Card (NIC), then the network system can alter its default behavior based on an XML configuration schema or file described below. Specifically, the sample rule defined by the XML configuration schema or file limits the number of steers to one move per 5 minutes for iOS-based client devices.

```
<Rule>
    <device_type>Ipad</device_type>
    <os_begin_version>5.0</os_begin_version>
    <os_end_version>6.4</os_end_version>
    <nic_version>BCMXXXX</nic_version>
    <steer_interval>300</steer_interval>
    <cm-cos>default</cm-cos>
</Rule>
```

Actions

API 200 may further allow an external entity to specify one or more actions to be performed on a particular client device or a set of client devices. In addition, the external entity can provide input on how to map one or more customized triggers applicable to a particular client device (or a set of client devices) to a predefined class of services. The one or more actions may include, but are not limited to, moving a client device, not moving a client device, allowing a threshold number of moves during a specified period of time for a client device, selecting a particular mechanism for moving a client device, selecting a particular time for moving a particular client device, etc.

A. Move or Not Move Client Device

First, the API can allow an external entity to configure whether to move or not to move a client device (or a set of client devices) based on any combination of the triggers. In some embodiments, the external entity may allow the network system to move a client device if the client device is on an active voice call. In some embodiments, the external entity may specify that the network system shall not move a client device on an active voice call, such that the client device will not experience any disrupted network services.

The triggers can be either statically defined or dynamically detected. For example, the external entity may specify that the network system shall move a client to a different radio and/or access point upon detecting poor voice call quality. Thus, during runtime, when the network system detects that the quality of a voice call is poor for a particular client device, the network device will move the particular client device to a different radio and/or access point. If, however, the network device detects that the quality of the voice call is good for the particular client device, the network system will not move the particular client device to a different radio/AP.

B. Threshold Number of Moves

Some client devices, by their vendor's default configurations, will stop trying to connect to the network if the client device has been de-authenticated by the network system for more than a threshold number of times. For these client devices, the API may allow an external entity to configure a maximum number of moves allowed by the network system. For example, if a maximum of three moves are allowed by the WLAN infrastructure, after three unsuccessful attempts to move a particular client device to associate with a different access point, the network system will not activate any move mechanism anymore to avoid the client device from permanently disconnecting with the WLAN.

In some embodiments, after the network system moves a particular client device from a first wireless frequency band (e.g., 2.4 GHz band) to a second wireless frequency band (e.g., 5 GHz band), the particular client device may undo the move. For example, the client device may continuously assess the received signal strength on various frequency bands and detect that the received signal strength on the first wireless frequency band is stronger than that on the second frequency band. Thus, the particular client device may disassociate with the WLAN on the second wireless frequency band, and re-associate with the WLAN on the first wireless frequency band. When the network system dynamically detects such client behaviors of reversing moves initiated by the network system, the network system may set a limit on the maximum number of moves attempted for such client devices. If the client particular client device continues to move back to the first wireless frequency band after a maximum threshold number of moves, the network system will not attempt to move the particular client device to a different AP or radio in the WLAN.

Note that, the network system can learn a rule associated with client device behaviors dynamically, and store the rule that may be applicable in the future. For example, when the network system detects that a particular client device identified by a particular MAC address exhibit the above described "undo" behavior, the network system can store the MAC address of the particular client device on a list. When the particular client device associates with the network system in the future, the network system will apply a static rule that limit the number of move attempts to, e.g., three times.

Moreover, the stored rule can be evolving over a period of time based on observed client behaviors. For example, when the same client device joins the WLAN for the third time, the network system may adjust the maximum allowed number of moves to two instead of three because of the persistent "undo" behaviors observed from the same client device in the past.

C. Selective Moves

The API can allow an external entity to select a particular move mechanism for a particular client device. The move mechanisms include, but are not limited to, a sticky move mechanism, a band steering mechanism, a load balancing mechanism, etc. In some embodiments, the external entity can specify precise control of move mechanism through a configuration file (e.g., an XML configuration).

In particular, the external entity can specify through the API a number of configuration parameters at various hierarchical levels supported by each move mechanism. In some embodiments, for sticky move mechanism, the external entity can specify a first threshold level of signal noise ratio (SNR) associated with a signal transmitted from a current AP. In addition, the external entity can specify a second threshold level of SNR acceptable at a target AP. Thus, when the SNR associated with a signal received from the current AP drops below the first threshold level, the network system will search for a target AP, whose signal's SNR exceeds the second threshold level, and steer the client device to associate with the target AP.

In some embodiments, for band steering mechanism, the external entity can specify through the API a first threshold level associated with a signal strength on a first wireless frequency band (e.g., 2.4 GHz band), and/or a second threshold level associated with a signal strength on a second wireless frequency band (e.g., 5 GHz band). Thus, when the received signal strength by a client device on the first wireless frequency band is weaker than the first threshold and/or when the received signal strength by the client device on the second wireless frequency band is stronger than the second threshold, the network system may steer the client device to disassociate with the network on the first wireless frequency band, and re-associate with the network on the second wireless frequency band.

In some embodiments, for load balancing mechanism, the external entity can specify through the API a threshold number of client devices associated with a particular radio of an access point. When the total number of client devices associated with the particular radio of the access point exceeds the threshold number, the network system will initiate a move of a client device to a different radio and/or access point to balance the load on the particular radio of the AP.

In some embodiments, for load balancing mechanism, the external entity can specify through the API a minimum threshold of SNR associated with a target radio of a target AP. Thus, when the SNR associated with the target AP that is under loaded exceeds the minimum threshold, the network system will initiate a move of one or more client device from other radios and/or APs to the target radio of the target AP.

Moreover, the API can allow an external entity to select a particular time period for moving a particular client device. For example, in some embodiments, the network system may delay the second move attempt by a predefined period of time, e.g., after 30 minutes. If the second move attempt has been undone by the client device, the network system further delays the third move attempt by an additional predefined period of time, e.g., after 60 minutes. The delay can be subsequently increased exponentially until it exceeds a threshold period of time after which the network system will not attempt to move the client device. Also, the network system may adjust the time period to match the preference and/or configurations of the particular client device.

Furthermore, the API can allow an external entity to select a particular subset of client devices meeting certain criteria to be moved by the network system. For example, the external entity can select the particular subset of client devices based on a combination of triggers and assign a class of service (e.g., silver class of service, or level 2 class of service) to the particular subset of client devices.

Also, the API can allow an external entity to select a particular protocol for moving the client devices. For example, for some client devices, the network system may de-authenticate the client devices to allow them to associate with a different AP in the WLAN. For other client devices that support IEEE 802.11v standards, the network system may transmit a basic service set (BSS) transition message to a respective client device. The BSS transition message allows an AP to request a client device that is currently associated with the AP to associate with a different AP as identified by the basic service set identifier (BSSID) in the message. The client device, upon receiving the BSS transition request, can either accept or deny the request in a response message to the AP. Hence, the network system can fingerprint client devices to identify the subset of client devices that support IEEE 802.11v standards and selectively use BSS transition mechanism rather than de-authentication mechanism to move the identified subset of client devices.

Although only a few ways of selective moves have been described in details here, it shall be noted that the API can support any kind of customized and selective moves of a particular client device (or a set of client devices).

Rule Engine

Rule engine supports a plurality of move mechanisms that are supported by the network system. The move mechanisms include, but are not limited to, sticky client move (ST 250), band steer move (BS 260), load balancing move (LB 270), de-authentication move (DA 280), etc. For example, a client device may be moved by the network system because it is a "sticky" client device. A "sticky" client device generally refers to a client device that does not disassociate with an access point even though the corresponding signal strength of a received radio frequency (RF) signal is weak. As another example, a client device may be moved by the network system to be associated with the same or different AP on a different radio frequency band. Furthermore, a client device may be moved by the network system to from a first AP to a second AP in the WLAN to balance traffic load between the first AP and the second AP. Also, a client device may simply be de-authenticated by its currently associated AP, such that the client device is forced to associate with another AP in the neighborhood.

The API provides an interface to allow an external entity to the WLAN to specify dynamically one or more triggers, as well as how to map a particular client device (or set of client devices) to a particular class of service (i.e., COS 290) based on the triggers. Rule engine can then determine a course of actions to be taken on the particular client device (or set of client devices) based on the class of service.

For example, as illustrated in FIG. 2, COS level 1 may allow the use of all four different move mechanisms, such as sticky client move (ST 250), band steer move (BS 260), load balancing move (LB 270), de-authentication move (DA 280), etc. Moreover, COS level 2 may only allow three of the supported move mechanisms, such as sticky client move (ST 250), load balancing move (LB 270), de-authentication move (DA 280), etc. Furthermore, COS level 3 merely allows two of the supported move mechanisms, such as sticky client move (ST 250), band steer move (BS 260), etc.

Therefore, the API allows for dynamic determination of selective control over the change of course of actions by a network system on a particular client device (or set of client devices). Conventionally, when the network system fails to move a subset of client devices in the WLAN, the network system will need to disable the client matching feature of the WLAN infrastructure. According to the present disclosure, the network system can use different move mechanism for different client devices, and thus allow flexible use of the different move mechanisms to ensure that the client matching feature of the WLAN infrastructure works for a majority of client devices in the WLAN.

Process for Software-Defined Wireless Device Management

Figure 3:
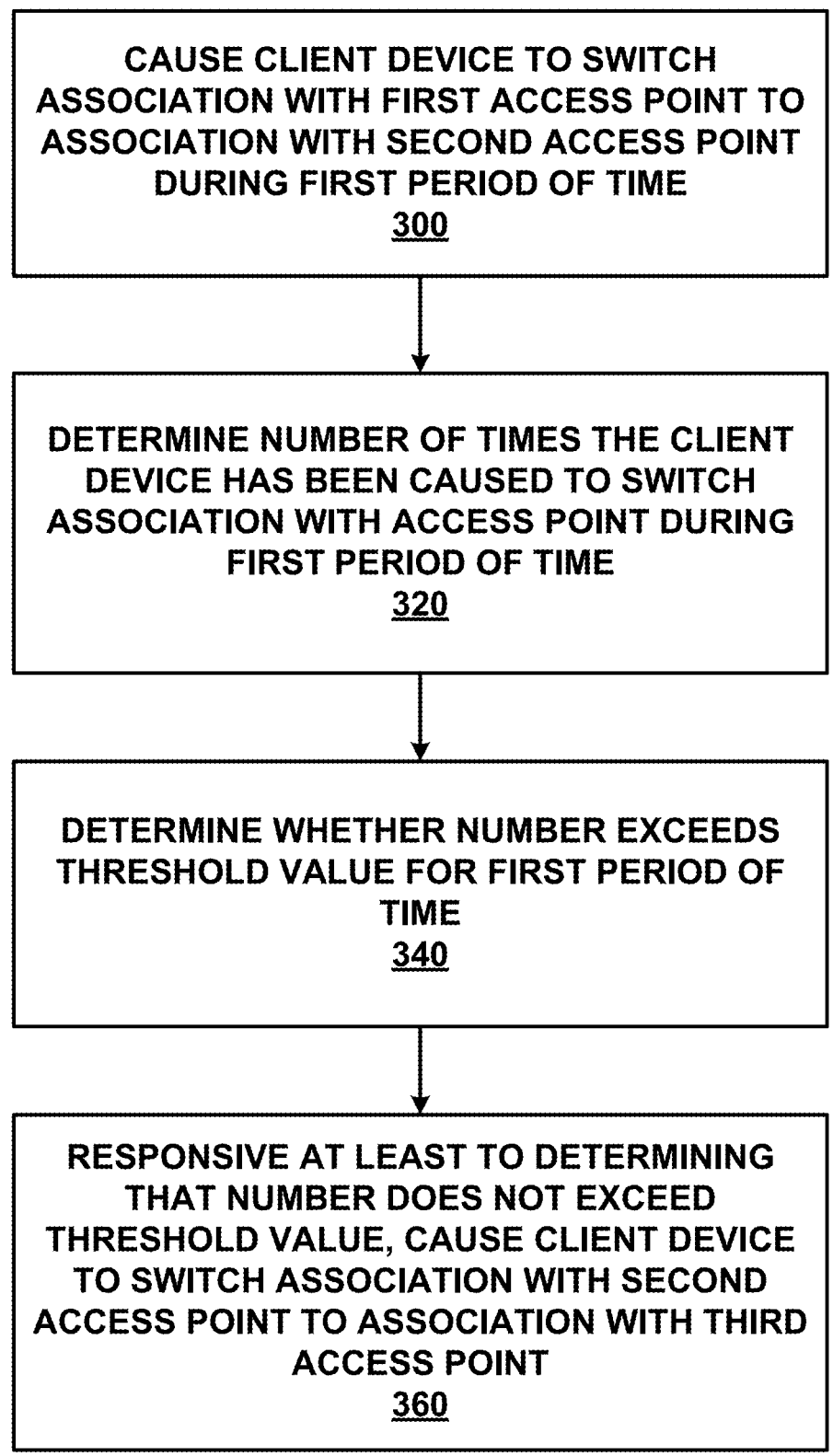
FIG. 3 illustrates an exemplary process for software-defined wireless device management in a WLAN according to embodiments of the present disclosure.

FIG. 3 illustrates an exemplary process for software-defined wireless device management in a WLAN according to embodiments of the present disclosure. During operations, a network device causes a client device to switch association with a first access point to an association with a second access point during a first period of time (operation 300). The network device then determines a number of times the client device has been caused to switch association with an access point during the first period of time (operation 320). Also, the network device determines whether the number exceeds a threshold value for the first period of time (operation 340). Responsive at least to determining that the number does not exceed the threshold value, the network device causes the client device to switch the association with the second access point to an association with the third access point (operation 360).

In some embodiments, responsive at least to determining that the number exceeds the threshold value, the network device refrains from causing the client device to switch the association with the second access point to the association with the third access point. Note that, the threshold value for the first period of time is based on device type. Moreover, the threshold value for the first period of time can further be based on one or more of: user role, traffic type, application type, session information, client roaming activity, device fingerprint, device signature, etc.

In some embodiments, responsive to determining that a service provided by the second access point does not meet one or more minimum criteria, for example, when the quality of connection is poor, the network device causes the client device to switch the association with the second access point to the association with the third access point.

Figure 4:
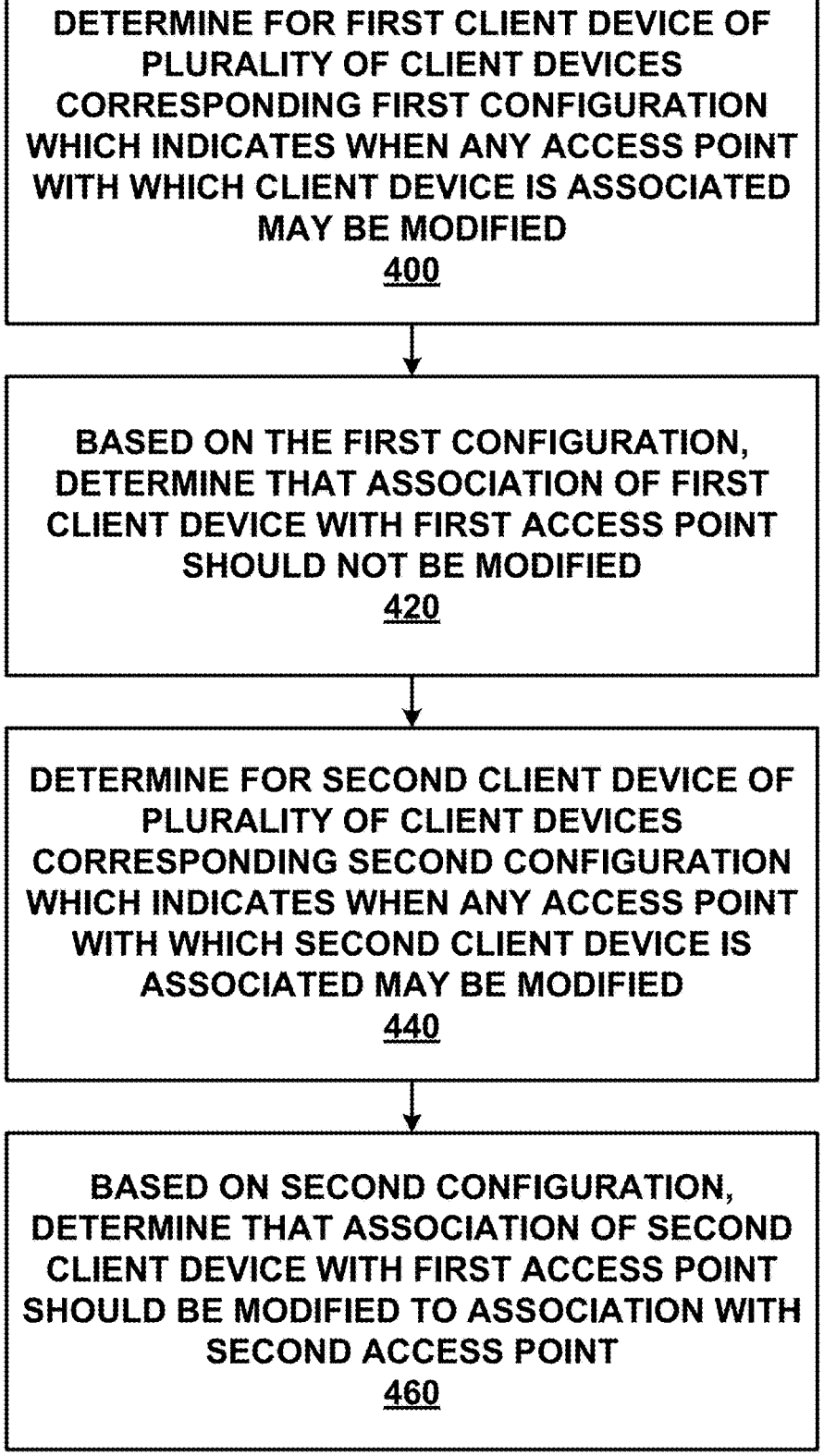
FIG. 4 illustrates an exemplary process for software-defined wireless device management in a WLAN according to embodiments of the present disclosure.

FIG. 4 illustrates another exemplary process for software-defined wireless device management in a WLAN according to embodiments of the present disclosure. During operations, a network device determines for a first client device of a plurality of client devices a corresponding first configuration which indicates when any access point with which the client device is associated may be modified (operation 400). Based on the first configuration, the network device further determines that an association of the first client device with a first access point should not be modified (operation 420). Also, the network device determines for a second client device of the plurality of client devices a corresponding second configuration which indicates when any access point with which the second client device is associated may be modified (operation 440). Here, the second configuration is different than the first configuration. Based on the second configuration, the network device determines that an association of the second client device with the first access point should be modified to an association with a second access point (operation 460).

In some embodiments, the first configuration indicates that an association of the first client device can never be caused to be modified by a network device. Thus, the client device can choose to modify its own association with the access point, but the network device will not intervene with the selection of APs for that client device.

In some embodiments, the first configuration indicates a maximum number of times that the association of the first client device with a current access point can be modified within a particular period of time. Furthermore, the second configuration indicates a maximum number of times that the association of the first client device with a current access point can be modified within a particular period of time.

In some embodiments, the network device automatically determines the first configuration and/or the second configuration based on one or more attributes associated with the first client device and/or the second client device, respectively. Note that, the attributes associated with the first client device may include a device type. In addition, the attributes associated with the first client device may also include one or more of: user role, traffic type, application type, session information, client roaming activity, device fingerprint, device signature, etc.

In some embodiments, the network device determines that the association of the second device with the first access point should be modified to the association with the second access point based on determining that the client device is a member of a same multicast group as client devices associated with the second access point.

In some embodiments, the network device determines that the association of the second client device with the first access point should be modified to the association with the second access point based on determining that the client device is on a voice call with poor quality and determining that the first configuration permits at least one more modification during the voice call.

In some embodiments, the network device determines that the association of the first client device with the first access point should not be modified to the association with the second access point based on determining that the first client device is on a voice call and determining that the second configuration prohibits modification during the voice call. In some embodiments, if it is determined that the second client device is on an active voice call, the second access point causes at least a third device to switch association with the second access point to association to a third access point.

Figure 5:
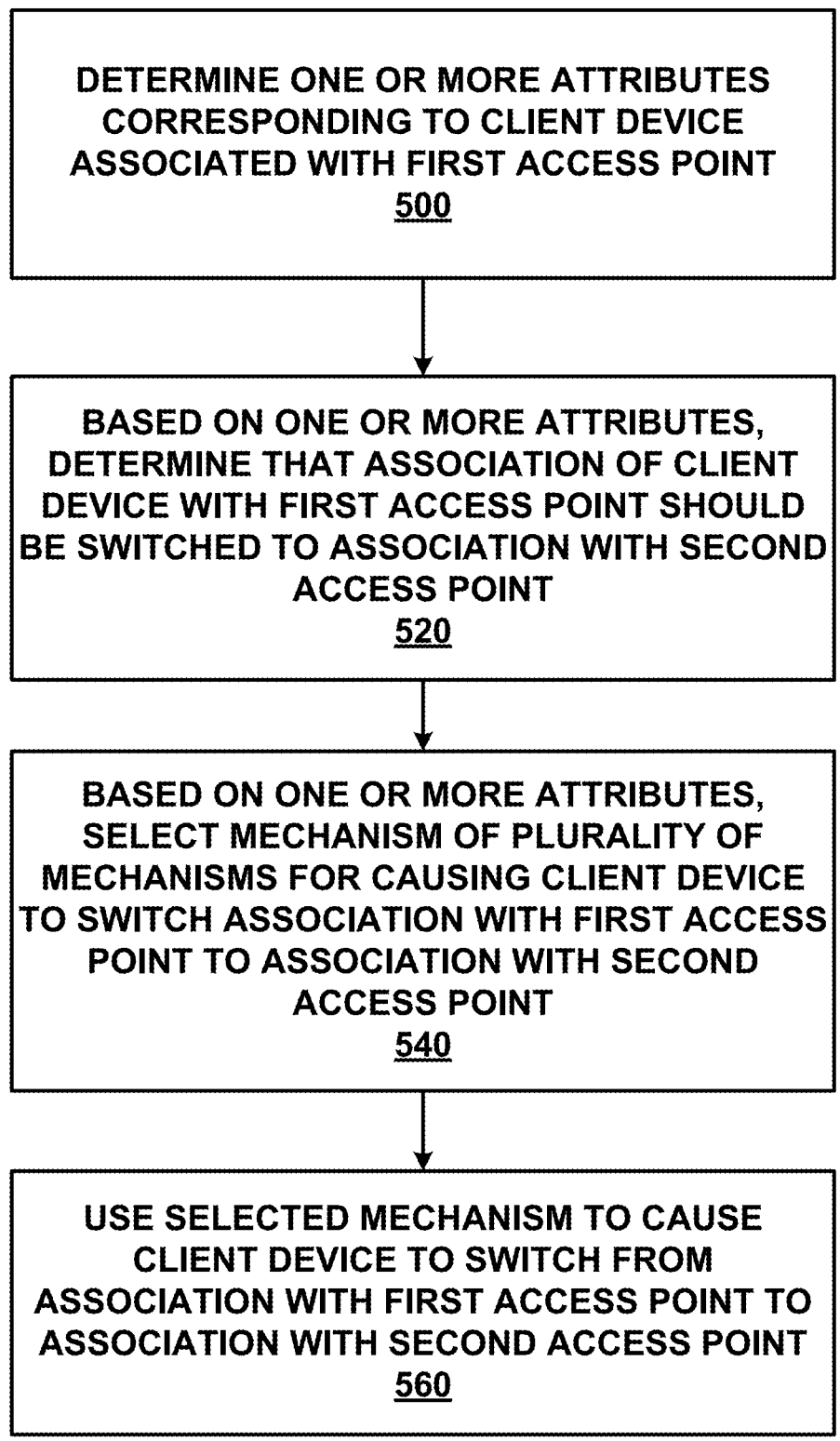
FIG. 5 illustrates an exemplary process for software-defined wireless device management in a WLAN according to embodiments of the present disclosure.

FIG. 5 illustrates yet another exemplary process for software-defined wireless device management in a WLAN according to embodiments of the present disclosure. During operations, a network device determines one or more attributes corresponding to a client device associated with a first access point (operation 500). Based on the one or more attributes, the network device determines that the association of the client device with the first access point should be switched to an association with a second access point (operation 520). Further, based on the one or more attributes, the network device selects a mechanism, of a plurality of mechanisms, for causing the client device to switch an association with the first access point to an association with the second access point (operation 540). Subsequently, the network device uses the selected mechanism to cause the client device to switch from the association with the first access point to the association with the second access point (operation 560).

In some embodiments, the selected mechanism involves the first access point transmitting de-authentication message or a dis-association message corresponding to the client device.

In some embodiments, the selected mechanism involves the first access point transmitting instructions to the client device to associate with the second access point. For example, the first access point may transmit a BSS transition request compliant with IEEE 802.11v standard to the client device to request the client device to associate with the second access point.

In some embodiments, the selected mechanism involves configuring the first access point to reject one or more requests from the client device and configuring the second access point to accept the one or more requests from the client device.

In some embodiments, the selected mechanism involves selecting a particular time during which the client device can be caused to switch association with the first access point to association with the second access point.

System for Software-Defined Wireless Device Management

Figure 6:
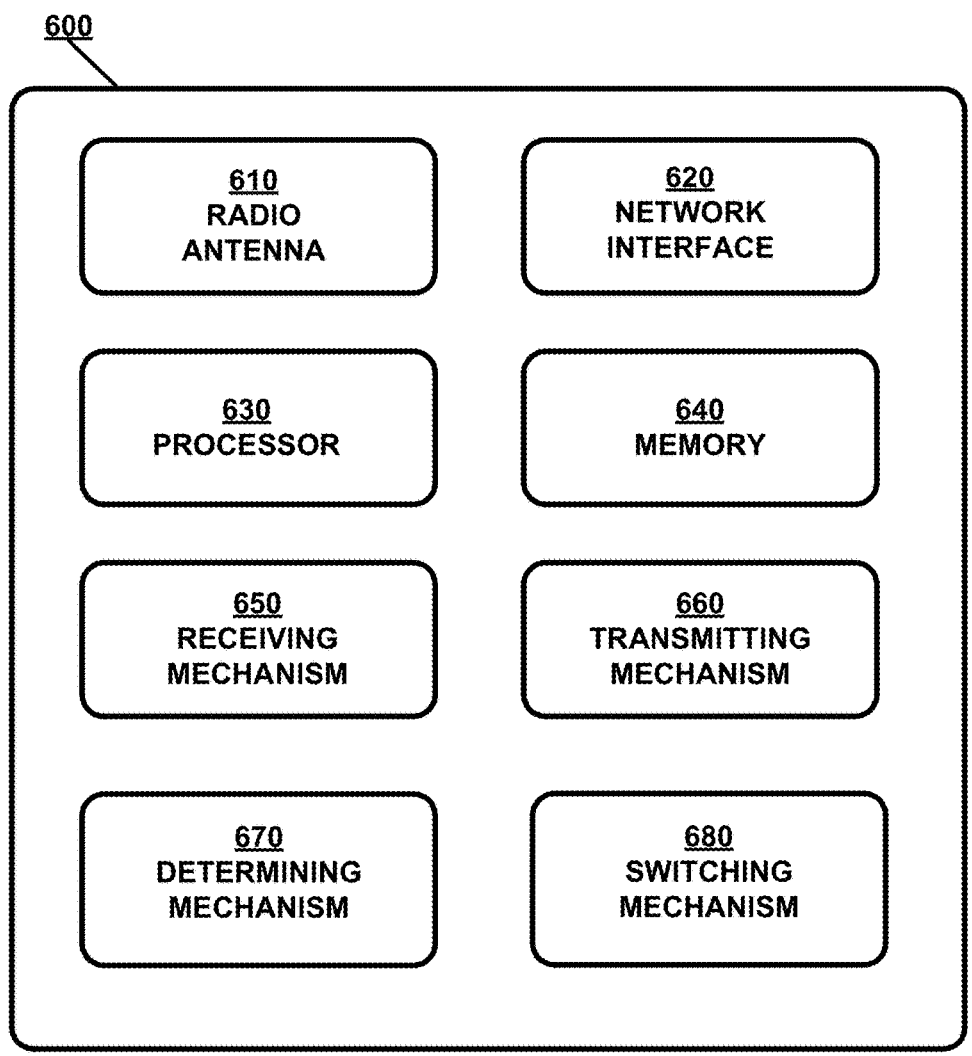
FIG. 6 is a block diagram illustrating an exemplary system for software-defined wireless device management in a WLAN according to embodiments of the present disclosure.

FIG. 6 is a block diagram illustrating a system for software-defined wireless device management in a WLAN according to embodiments of the present disclosure.

Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes an receiving mechanism 650, a transmitting mechanism 660, and a detecting mechanism 670, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on.

Determining mechanism 670 generally determines whether and how to cause a client device switch to connect with a different radio and/or access point. Specifically, in some embodiments, determining mechanism 670 determines a number of times the client device has been caused to switch association with an access point during a period of time. Further, determining mechanism 670 can determine whether the number exceeds a threshold value for first period of time.

In some embodiments, determining mechanism 670 determines for a first client device of a plurality of client devices a corresponding first configuration, which indicates when any access point with which the client device is associated may be modified. Based on the first configuration, determining mechanism 670 determines that an association of the first client device with a first access point should not be modified. Furthermore, determining mechanism 670 determines for a second client device of the plurality of client devices a corresponding second configuration, which indicates when any access point with which the second client device is associated may be modified. Note that, the second configuration is different than the first configuration. Based on the second configuration, determining mechanism 670 can determine that an association of the second client device with the first access point should be modified to an association with a second access point.

In some embodiments, the first configuration indicates that an association of the first client device can never be caused to be modified by a network device. In some embodiments, the first configuration indicates a maximum number of times that the association of the first client device with a current access point can be modified within a particular period of time. In some embodiments, the second configuration indicates a maximum number of times that the association of the first client device with a current access point can be modified within a particular period of time.

In some embodiments, determining mechanism 670 automatically determines the first configuration and/or the second configuration based on one or more attributes associated with the first client device and/or the second client device, respectively. The attributes associated with the first client device may include, but are not limited to, a device type, a user role, a traffic type, an application type, session information, a client roaming activity, a device fingerprint, a device signature, etc.

In some embodiments, determining mechanism 670 determines that the association of the second device with the first access point should be modified to the association with the second access point based on determining that the client device is a member of a same multicast group as client devices associated with the second access point.

In some embodiments, determining mechanism 670 determines that the association of the second client device with the first access point should be modified to the association with the second access point based on determining that the client device is on a voice call with poor quality and determining that the first configuration permits at least one more modification during the voice call.

In some embodiments, determining mechanism 670 determines that the association of the first client device with the first access point should not be modified to the association with the second access point based on determining that the first client device is on a voice call and determining that the second configuration prohibits modification during the voice call.

Furthermore, determining mechanism 670 can determine one or more attributes corresponding to a client device associated with a first access point. Based on the one or more attributes, determining mechanism 670 determines that the association of the client device with the first access point should be switched to an association with a second access point.

Switching mechanism 680 generally causes a client device to switch to a different radio and/or access point. Specifically, switching mechanism 680 can cause a client device to switch association with a first access point to an association with a second access point during a first period of time. Responsive at least to determining mechanism 670 determines that the number does not exceed the threshold value, switching mechanism 680 causes the client device to switch the association with the second access point to an association with the third access point. Responsive at least to determining mechanism 670 determines that the number exceeds the threshold value, switching mechanism 680 refrains from causing the client device to switch the association with the second access point to the association with the third access point. Note that, the threshold value for the first period of time is based on one or more attributes of a device type, a user role, a traffic type, an application type, session information, a client roaming activity, a device fingerprint, a device signature, etc.

Moreover, based on the above one or more attributes, switching mechanism 680 can select one of a plurality of mechanisms for causing the client device to switch an association with the first access point to an association with the second access point. Further, switching mechanism 680 uses the selected mechanism to cause the client device to switch from the association with the first access point to the association with the second access point. In some embodiments, the selected mechanism may involve the first access point transmitting de-authentication message or a dis-association message corresponding to the client device. In some embodiments, the selected mechanism may involve the first access point transmitting instructions to the client device to associate with the second access point. In some embodiments, the selected mechanism may involve configuring the first access point to reject one or more requests from the client device and configuring the second access point to accept the one or more requests from the client device. In some embodiments, the selected mechanism involves selecting a particular time during which the client device can be caused to switch association with the first access point to association with the second access point.

In some embodiments, responsive to determining mechanism 670 determines that a service provided by the second access point does not meet a minimum criteria, switching mechanism 680 causes the client device to switch the association with the second access point to the association with the third access point.

In some embodiments, responsive to determining mechanism 670 determines that the second client device is on an active voice call, switching mechanism 680 causes at least a third device to switch association with the second access point to association to a third access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium storing instructions executable by a processor to:
   switch a client device from being associated with a first access point to being associated with a second access point during a first period of time;
   determine a number of times the client device has switched the client device's association with a number of access points within the first period of time;
   determine whether the number of times exceeds a threshold value for the first period of time;
   determine whether a trigger to switch the client device to being associated with a third access point has occurred, wherein the trigger occurs responsive to the client device being a member of a same multicast group as client devices associated with the third access point; and
   responsive to determining that the number of times does not exceed the threshold value and that the trigger has occurred, switch the client device from being associated with the second access point to being associated with the third access point.

2. The medium of claim 1, wherein the operations further comprise:
   responsive at least to determining that the number of times exceeds the threshold value, refraining from causing the client device to switch the association with the second access point to the association with the third access point.

3. The medium of claim 1, wherein causing the client device to switch the association with the second access point to the association with the third access point is further responsive to determining that a service provided by the second access point does not meet a minimum criteria.

4. The medium of claim 1, wherein the threshold value for the first period of time is based on device type.

5. The medium of claim 1, wherein the threshold value for the first period of time is based on one or more of:
   a user role;
   a traffic type;
   an application type;
   session information;
   a client roaming activity;
   a device fingerprint; and
   a device signature.

6. A non-transitory computer readable medium storing instructions which, when executed by one or more hardware processors, causes a processor to:
   determine for a first client device of a plurality of client devices a corresponding first configuration which indicates when a first access point associated with the first client device is able to be modified;
   based on the first configuration, determine that an association of the first client device with the first access point should be maintained;
   determine for a second client device of the plurality of client devices a corresponding second configuration which indicates when a second access point associated with the second client device is able to be modified, wherein the second configuration is different than the first configuration;
   determine whether a trigger to switch the client device to being associated with a third access point has occurred, wherein the trigger occurs responsive to the client device being a member of a same multicast group as client devices associated with the third access point; and based on the second configuration and the trigger, determine that an association of the second client device with the second access point should be modified to an association with the third access point.

7. The medium of claim 6, wherein the first configuration indicates that an association of the first client device can never be caused to be modified by a network device.

8. The medium of claim 6, wherein the first configuration indicates a maximum number of times that the association of the first client device with the first access point can be modified within a particular period of time.

9. The medium of claim 6, wherein the second configuration indicates a maximum number of times that the association of the second client device with the second access point can be modified within a particular period of time.

10. The medium of claim 6, wherein the operations further comprise automatically determining the first configuration and the second configuration based on one or more attributes associated with the first client device and the second client device, respectively.

11. The medium of claim 10, wherein the attributes associated with the first client device comprise a device type.

12. The medium of claim 10, wherein the attributes associated with the first client device comprise one or more of:
a user role;
a traffic type;
an application type;
session information;
a client roaming activity;
a device fingerprint; and
a device signature.

13. The medium of claim 6, wherein determining that the association of the second client device with the second access point should be modified to the association with the third access point is further based on determining that the client device is on a voice call with poor quality and determining that the first configuration permits at least one more modification during the voice call.

14. The medium of claim 6, wherein determining that the association of the first client device with the first access point should not be modified to the association with the second access point is further based on determining that the first client device is on a voice call and determining that the second configuration prohibits modification during the voice call.

15. The medium of claim 6, wherein the operations further comprise responsive to determining that the second client device is on an active voice call:
causing, by the second access point, at least a third device to switch association with the second access point to association to the third access point.

16. A non-transitory computer readable medium storing instructions which, when executed by one or more hardware processors causes the one or more hardware processors to:
determine one or more attributes corresponding to a client device associated with a first access point;
determine whether a trigger to switch the client device to being associated with a second access point has occurred, wherein the trigger occurs responsive to the client device being a member of a same multicast group as client devices associated with the second access point;
based on the one or more attributes and the trigger, determine that the association of the client device with the first access point should be switched to an association with the second access point;
based on the one or more attributes, select a mechanism, of a plurality of mechanisms, for causing the client device to switch an association with the first access point to an association with the second access point; and
use the selected mechanism to cause the client device to switch from the association with the first access point to the association with the second access point.

17. The medium of claim 16, wherein the selected mechanism comprises the first access point transmitting de-authentication message or a disassociation message corresponding to the client device.

18. The medium of claim 16, wherein the selected mechanism comprises the first access point transmitting instructions to the client device to associate with the second access point.

19. The medium of claim 16, wherein the selected mechanism for causing the client device to switch associations comprises configuring the first access point to reject one or more requests from the client device and configuring the second access point to accept the one or more requests from the client device.

20. The medium of claim 16, wherein the selected mechanism comprises a particular time during which the client device can be caused to switch association with the first access point to association with the second access point.

* * * * *